(12) United States Patent
Arslan et al.

(10) Patent No.: US 6,243,677 B1
(45) Date of Patent: Jun. 5, 2001

(54) METHOD OF OUT OF VOCABULARY WORD REJECTION

(75) Inventors: Levent M. Arslan, Arlington, VA (US); Lorin P. Netsch, Allen; Periagaram K. Rajasekaran, Richardson, both of TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/177,710

(22) Filed: Oct. 23, 1998

Related U.S. Application Data

(60) Provisional application No. 60/066,193, filed on Nov. 19, 1997.

(51) Int. Cl.$^7$ .............................. G10L 15/06; G10L 15/20
(52) U.S. Cl. ........................................... 704/244; 704/250
(58) Field of Search ................................. 704/243, 244, 704/250, 255, 256; 379/88.01, 88.03

(56) References Cited

U.S. PATENT DOCUMENTS

| | | | |
|---|---|---|---|
| 4,802,231 | * 1/1989 | Davis | 704/243 |
| 5,165,095 | * 11/1992 | Borcherding | 704/246 |
| 5,325,421 | * 6/1994 | Hou et al. | 379/88.03 |
| 5,452,397 | * 9/1995 | Ittycheriah et al. | 704/240 |
| 5,598,507 | * 1/1997 | Kimber et al. | 704/246 |
| 5,606,643 | * 2/1997 | Balasubramanian et al. | 704/243 |
| 5,649,057 | * 7/1997 | Lee et al. | 704/256 |
| 5,684,924 | * 11/1997 | Stanley et al. | 704/244 |
| 5,732,187 | * 3/1998 | Scruggs et al. | 704/251 |
| 5,832,429 | * 11/1998 | Gammel et al. | 704/255 |
| 5,842,165 | * 11/1998 | Raman et al. | 704/255 |
| 5,893,059 | * 4/1999 | Raman | 704/256 |
| 5,895,448 | * 4/1999 | Vysotsky et al. | 704/251 |

OTHER PUBLICATIONS

C. J. Wellekens, "Mixture density estimators in Viterbi training," 1992 IEEE International Conference on Acoustics, Speech and Signal Processing, ICASSP–92, Mar. 23–26, 1992, vol. 1, pp. 361–364.*

Murakami et al., "Unknown–multiple signal source clustering problem using ergodic HMM and applied to speaker classification," Fourth International Conference on Spoken Language, ICSLP 96, Oct. 3–6, 1996, vol. 4, pp. 2704–2710.*

* cited by examiner

*Primary Examiner*—William R. Korzuch
*Assistant Examiner*—Martin Lerner
(74) *Attorney, Agent, or Firm*—Robert L. Troike; Frederick J. Telecky, Jr.

(57) ABSTRACT

An improved method of providing out-of-vocabulary word rejection is achieved by adapting an initial garbage model (23) using received incoming enrollment speech (21).

7 Claims, 2 Drawing Sheets

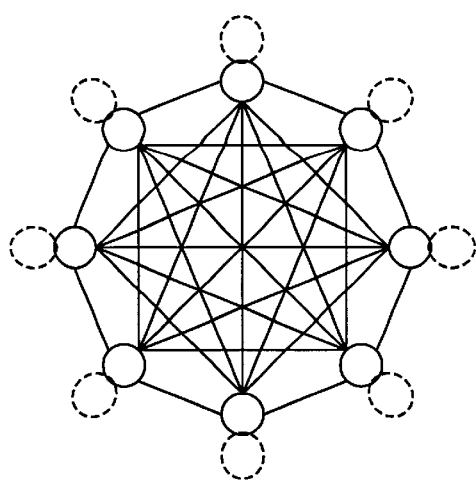
FIG. 1
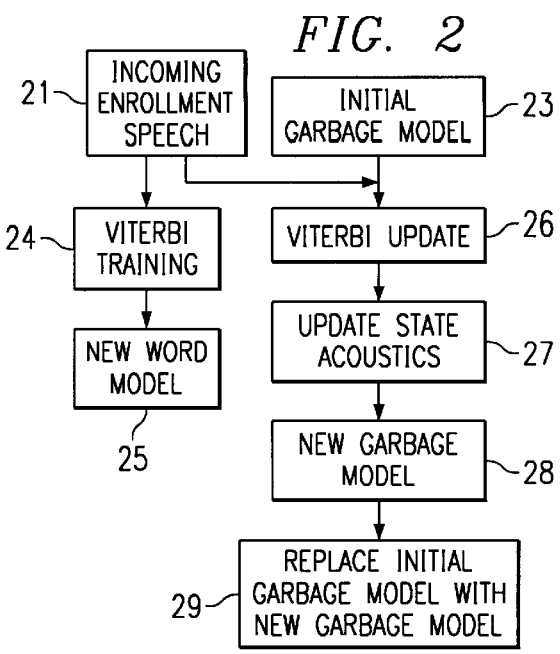
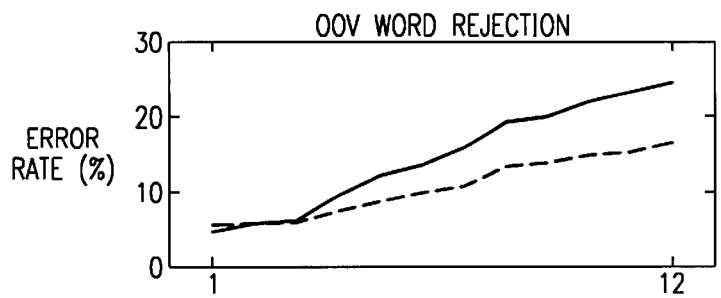
FIG. 3A
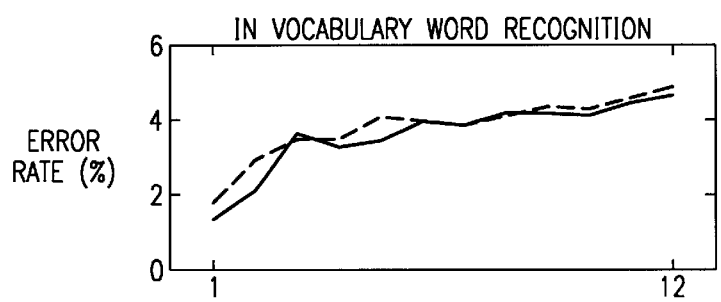
FIG. 3B
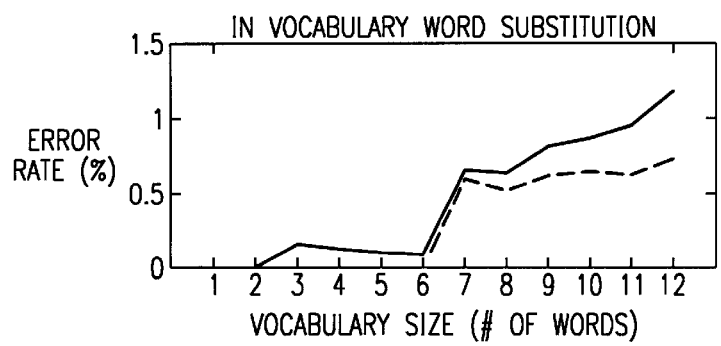
FIG. 3C

METHOD OF OUT OF VOCABULARY WORD REJECTION

This application claims priority under 35 USC § 119(e)(1) of provisional application number 60/066,193, filed Nov. 19, 1997.

TECHNICAL FIELD OF THE INVENTION

This invention relates to a method of out-of-vocabulary word rejection and more particularly to creating speaker-dependent garbage models.

BACKGROUND OF THE INVENTION

Speech recognition systems are now being used in practical applications over telephone channels. Algorithms that are designed for small vocabulary, isolated word applications can produce acceptable recognition rates. A basic assumption for most speech recognition systems is that the utterance to be recognized contains only the words from the recognition vocabulary and background silence. However, previous studies have shown that it is extremely difficult to get real-world users of such systems to speak only the allowable input words. In a large scale trial of a speaker-independent, isolated word technology, it is noted that only 65% of all the callers followed the protocol, although the vocabulary consisted of only five words. Most conventional isolated word speech recognition algorithms are not designed to handle situations where users speak out-of-vocabulary (OOV) words.

In present art systems, there have been studies to solve the OOV problem. An ergodic Hidden Markov Model (HMM), commonly referred to as the "garbage" model, which is trained on speech collected from a large sample of speakers is used to model OOV words. It is generally designed such that each of the states represent a broad phoneme class acoustic, and the transition probabilities represent the frequency of making transitions between pairs of phoneme classes. However, for spoken speed dialing (SSD), which is a speaker-dependent application, there are mainly two problems with this approach. Firstly, since the garbage model is not trained on the particular speaker, its average acoustics may not match the vocal tract characteristics of that person. Secondly, the enrollment may be made under very different conditions (i.e., different levels of background noise, various handset types, etc.) Both of these problems contribute to a mismatch between the within-vocabulary (WV) model set and the garbage model.

SUMMARY OF THE INVENTION

In this invention, we disclose that adapting the garbage model acoustics for each speaker will result in a more accurate model for the OOV words for that speaker.

These and other features of the invention that will be apparent to those skilled in the art from the following detailed description of the invention, taken together with the accompanying drawings.

DESCRIPTION OF THE DRAWINGS

FIG. 1 illustrates a "garbage" model HMM structure;

FIG. 2 illustrates a speaker dependent garbage model flowchart;

FIG. 3 illustrates comparison of the Spoken Speed Dialing single fixed speaker independent garbage model (SSD-INDEP) (solid lines) and Spoken Speed Dialing dynamic speaker dependent garbage model (SSD-SPDEP) (dashed lines) performance over changing vocabulary size wherein FIG. 3A illustrates the out of word rejection as a function of vocabulary size;

FIG. 3B illustrates the in vocabulary word recognition as a function of vocabulary size; and FIG. 3C illustrates the in vocabulary word substitution as a function of vocabulary size.

DESCRIPTION OF PREFERRED EMBODIMENTS

Figure 4A:
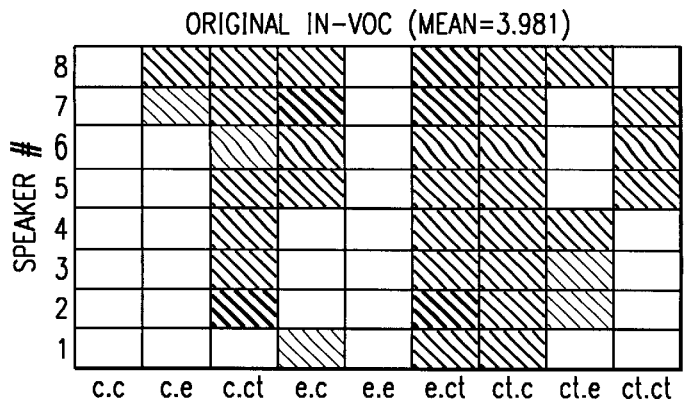
FIG. 4 illustrates comparison of the SSD-INDEP and SSD-SPDEP error rates for training and testing ("a.b.": trained on handset "a" tested on handset "b") where FIG. 4A plots in vocabulary word error rate for SSD-INDEP.
FIG. 4B plots out of vocabulary word rejection error rate for SSD-INDEP.
FIG. 4C plots in vocabulary work error rate for SSD-INDEP.
FIG. 4D plots out of vocabulary rejection error rate for SSD-SPDEP.
Figure 4B:
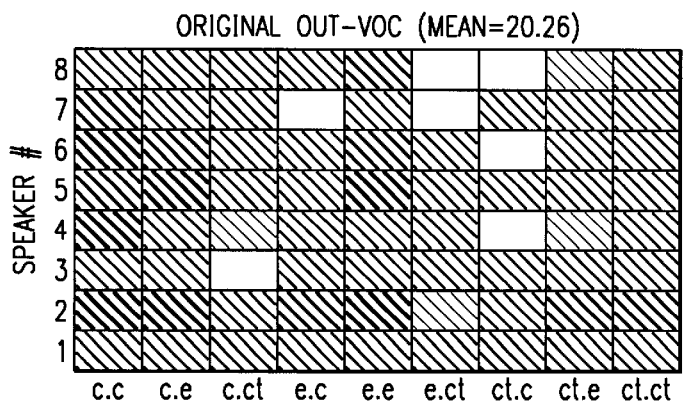

This patent application describes a procedure which improves out-of-vocabulary (OOV) word rejection performance for speech recognition systems. Example applications are the spoken speed dialing (SSD) task dictation machines, personal computer multimedia applications, and voice activated inquiry systems such as bank account information retrieval. To implement these tasks, training algorithms generate models for each word in a predefined vocabulary from the utterances provided by speakers during enrollment. An important problem associated with the task is when users speak words that are not listed in the vocabulary (that is, OOV words). The present-art approach to this problem creates a garbage model that will represent all of the OOV words. This garbage model is trained using speech data from a large number of speakers, and represents general phonetic class acoustic information found in speech. However, this garbage model may not represent the vocal tract acoustics of each speaker well. Using a garbage model trained to the specific phonetic class acoustics of each speaker, as described in the present application, OOV word rejection error rate was reduced by 74%, when only a single microphone was used in the enrollment for all the names. Moreover, a 10% improvement in the within-vocabulary (WV) word error rate was also noted. When the enrollment was done using various handsets, the OOV word rejection error rate was reduced by 30%, while the within-vocabulary error rate was kept as the same level.

As mentioned above, presently a single speaker-independent garbage model is being used for the Spoken Speed Dialing (SSD) application. It is an ergodic, 8-state HMM with infinite duration modeling. The method herein requires adaptation of this model to each speaker. In order to accomplish this task, we require training data from each speaker to update the acoustics of the speaker-independent model. There are two ways to collect the necessary data. One way is to ask each speaker to speak several phrases prior to the enrollment of the names. Another way is to use the utterances of the within-vocabulary names collected in the enrollment phase. In the preferred embodiment of the invention, we followed the second approach. One may think it is counter-intuitive to expect a model that is trained on within-vocabulary words to actually represent out-of-vocabulary words. However, since the ergodic model is an 8-state model, it will only represent the broad phoneme class acoustics. That is, it will not be able to represent detailed acoustic information specific to each within-vocabulary word. In the preferred embodiment we do not update the transition probabilities in the garbage model to prevent the garbage model from modeling the articulation that is present in the within-vocabulary words.

Since some users may enroll only a few names, it is desirable to have an appropriate initial garbage model. We start with a speaker-independent garbage model, and we update the garbage model after each name enrollment using deleted interpolation. This allows us to restrict the garbage model from modeling the within-vocabulary names in a detailed fashion, and thereby causing degradation of within-vocabulary error rate performance. It should be clear that there is always a trade off between the within-vocabulary error rate (percentage of times that the caller's request is rejected or recognized incorrectly when he speaks one of the within-vocabulary names), and the out-of-vocabulary error rate (percentage of times that a within-vocabulary name is substituted when the caller speaks a name that he has not enrolled yet). The disclosed invention improves the out-of-vocabulary error rate without causing degradation in the within-vocabulary error rate performance.

In FIG. 1, the ergodic 8-state garbage model structure is shown. Starting with this initial structure, we train a speaker independent garbage model. In the training, the initial acoustic observations are generated by Linde-Buzo-Gray vector quantization codebook search algorithm over the Voice Across America (VAA) database. After we obtain a speaker-independent garbage model we follow the steps outlined in FIG. 2 to create a speaker-dependent garbage model. We start with speaker-independent garbage model (23) as our initial garbage model. When a speaker requests to enroll a new word (21) to his vocabulary list, we first create a new word model (25) from the incoming enrollment speech using Viterbi training algorithm 24. We use the same enrollment speech 21 in updating the initial garbage model 27 acoustics for the speaker using Viterbi algorithm 26. We then replace the initial garbage model with the new garbage model at step 29. The Viterbi search algorithm is well known in present art speech recognition and speech recognition model training systems. The Viterbi algorithm provides mapping between incoming speech acoustics and HMM speech model states. This algorithm is well known in the present art. The mapping can then be used to estimate parameters of speech that correspond to a given state using the input speech acoustics. For more details see article by Lawrence Rabiner "A Tutorial on Hidden Markov Models and Selected Applications in Speech Recognition," from Proceedings of IEEE, Vol. 7, No. 2, February 1989, pgs. 257–286. We repeat the same procedure outlined in FIG. 2 whenever the speaker enrolls another word. Here, it should be noted that each speaker starts with the same initial speaker-independent garbage model, but as they enroll new words to their own vocabularies, they adapt their own garbage models to their own vocal tract characteristics.

The Speech Research Branch collected a speech database intended for spoken speed dialing (SSD) evaluation. This database was collected over telephone lines, using three different handsets. One handset had a carbon button transducer, one an electret transducer, and the third was a cordless phone.

Eight speakers, four female and four male provided one enrollment and three test sessions using each handset. During the enrollment session each speaker said one repetition of each of 25 names. The names spoken were of the form of "first-name last-name". Twenty of the names were unique to each speaker, and all speakers shared five names. During the nine test sessions, each speaker said the 25 names three times, but in a randomized order. For the test sessions the names were preceded by the word "call".

We created enrollment models for each speaker, handset type, and name using a Viterbi training algorithm. We also created a speaker-independent, ergodic garbage model with 8 states. The initial seeds for state acoustic observation vectors were generated by Linde-Buzo-Gray codebook search algorithm over the Voice Across America (VAA) database. The transition probabilities were initialized such that self transitions within states were assigned higher probabilities (0.4) than making transitions to other states (0.18). Also the escape probabilities from the model were assigned low probabilities (0.09) to ensure that sufficient number of frames were observed before leaving the garbage model. Using this initial model, both the transitions and observation vectors were updated across the VAA database using a Viterbi training algorithm. In order to test the invention of adaptation of speaker-dependent garbage models, two experiments were performed on the test database. The following two subsections discuss these experiments.

The first experiment involves the update of the garbage model for each speaker assuming that the caller can enroll names at different times from different handsets. In order to simulate this scenario, equal number of names from each of the three handsets were used as enrollment data for each speaker. In order to observe the influence of increasing vocabulary size on both the OOV and within-vocabulary error rates, we updated the garbage model every time another name was enrolled by the speaker. In FIGS. 3A–3C, the comparison of the system using a single fixed speaker-independent garbage model (SSD-INDEP, solid lines) and the system using a dynamic speaker-dependent garbage model (SSD-SPDEP, dashed lines) is illustrated. The horizontal axis corresponds to the vocabulary size. We simulated the experiment for vocabulary sizes ranging from 1 to 12. In each case, the last 13 names were kept out of the vocabulary and they were used of OOV testing. From top to bottom, the graphs correspond to OOV word rejection, within-vocabulary word recognition, and within-vocabulary substitution errors respectively. Looking at the top plot of FIG. 3A, it can be concluded that OOV word rejection performance is improved by using the SSD-SPDEP system. The difference in performance becomes more distinct as the vocabulary size increases. The second graph of FIG. 3B shows that the within-vocabulary error rates for both systems are very close. It should be reminded at this point that there are two types of errors encountered in within-vocabulary word recognition. The first type of error, deletion, represents the substitution of the garbage model instead of one of the within-vocabulary words. The other type of error, substitution, represents the insertion of one of the within-vocabulary words in place of another. The bottom plot in FIG. 3C illustrates the comparison of the substitution errors of the two systems. Since in practice substitution errors may result in connecting the caller to a wrong person, they are highly critical errors. It is seen from the graph that usage of a speaker-dependent garbage model results in fewer substitution errors.

Figure 4C:
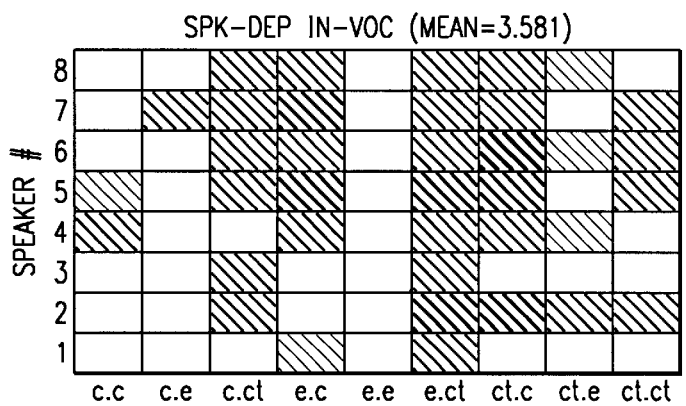
Figure 4D:
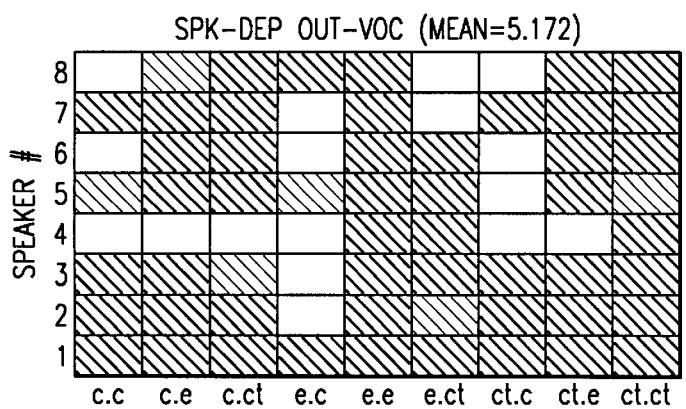

The second experiment involves the investigation of handset dependency along with speaker dependency. Here, our assumption is that the user will enroll all the names from the same handset, instead of various handsets. This condition is worth investigating, because in practice many users enroll most of the names that they would like to speak from the same handset. In this case, the number of within-vocabulary words was fixed at 12 names, and the remaining 13 names from each speaker were used as OOV test data. In this experiment, the microphone mismatch condition (training and testing on different microphones) was investigated. In FIG. 4A–4D, the comparison of OOV rejection and within-vocabulary word recognition performances is illustrated when using SSD-INDEP versus SSD-SPDEP systems. The plots can be thought of as 3-D figures, where the third dimension, the gray-scale level, corresponds to the error rate. Here, the lighter colors correspond to lower error rates. Each row represents the error rates for a different speaker, and each column represents the error rates for a different handset condition (for example "e.cl" represents the test condition where the names were enrolled using an electret transducer, and the test was done on a cordless handset.) FIGS. 4A and 4C plots correspond to OOV word rejection error for SSD-INDEP and SSD-SPDEP respectively. The overall error rate for within-vocabulary word rejection dropped from 20.26% to 5.17% (a 74% decrease). It is also noted that the variance of the error rate across various speakers and handset conditions was reduced to a great extent. FIGS. 4A and 4C plots correspond to within-vocabulary word error rate for SSD-INDEP and SSD-SPDEP respectively. The overall error rate for within-vocabulary word recognition dropped from 3.98% to 3.58% (a 10% decrease). The dramatic reduction in the error rate can partly be explained by the speaker dependency of the garbage model. The other important factor that is contributing to performance improvement is the fact that the garbage model and the within-vocabulary name models were trained using the same handset. Since each model is trained under the same conditions (same speaker, same handset), when there is a mismatch between the training and testing conditions, all of them react in a similar fashion, and their likelihood levels remain the same. However, if a single garbage model had been trained using data from various conditions (SSD-INDEP case), this would have resulted in biased decisions in the recognition stage. For example, under the carbon testing condition, the garbage model which has been trained partly on carbon data would have an advantage over the within-vocabulary name models which are trained under the cordless or electret condition.

In this invention, a speaker-dependent garbage model is disclosed for the OOV word rejection problem, and is shown to result in performance improvement over the original speaker-independent garbage model system for the SSD database. When the enrollment data is collected using the same handset, a 74% improvement in the error rate is achieved over the original method.

The use of the suggested approach is not limited to the SSD application only. The same approach can be used in other applications where sufficient data can be collected from the speaker during the recognition session. Since the approach that is suggested here is based on on-line adaptation of the garbage model using incoming speech, it can be used anywhere speaker adaptation methods are applicable. These include personal computer multimedia applications, dictation machines, translation machines, etc.

Although the present invention and its advantages have been described in detail, it should be understood that various changes, substitutions and alterations can be made herein without departing from the spirit and scope of the invention as defined by the appended claims.

What is claimed is:

1. A method of providing out-of-vocabulary word rejection comprising the steps of:
   providing an initial speaker-independent garbage model;
   receiving incoming enrollment speech; and
   adapting the initial speaker-independent garbage model using received incoming enrollment speech to provide a new speaker-adapted garbage model.

2. The method of claim 1, wherein said adapting step includes creating said new garbage model from the incoming enrollment speech using a Viterbi algorithm.

3. A method of speech enrollment comprising the steps of:
   receiving enrollment speech;
   creating a new word model from said incoming enrollment speech and adding to a vocabulary list;
   providing an initial speaker-independent garbage model; and
   adapting said initial speaker-independent garbage model using said received enrollment speech to provide a new speaker adapted garbage model.

4. The method of claim 3, wherein said creating a new word model includes creating said new word model from said enrollment speech using Viterbi training algorithm.

5. The method of claim 4, wherein said adapting step includes creating said new speaker-adapted garbage model from said enrollment speech using Viterbi algorithm.

6. The method of claim 5, wherein said adapting step includes repeatedly updating said initial speaker-independent garbage model to create said new garbage model from said enrollment speech and replacing said initial speaker-independent garbage model with said new garbage model.

7. A method of spoken speed dialing comprising:
   a method of speech enrollment comprising the steps of:
      receiving enrollment speech,
      creating a new word model from said incoming enrollment speech and adding to a vocabulary list,
      providing an initial speaker-independent garbage model, and
      adapting said initial speaker-independent garbage model using said received enrollment speech to provide a new speaker-adapted garbage model and using said speaker-adapted garbage models to recognize speed dialing phrases.

* * * * *